Dec. 18, 1934.  H. ANSCHÜTZ  1,985,069
ELECTRIC TIMING CIRCUIT
Filed April 11, 1933
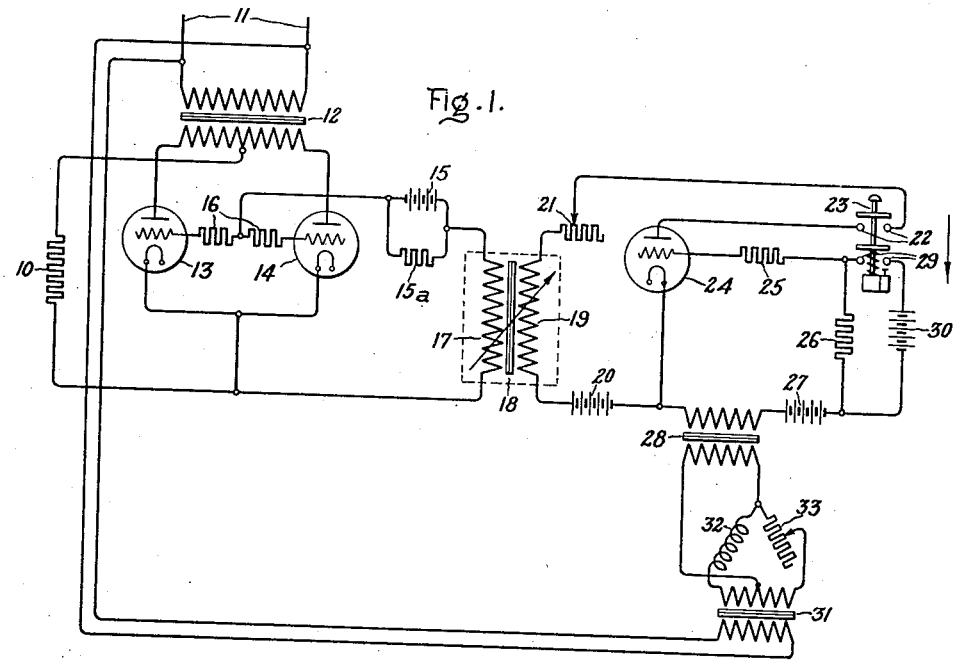
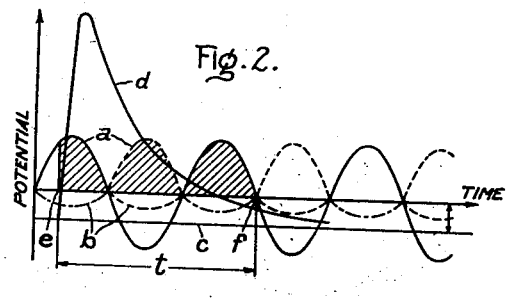
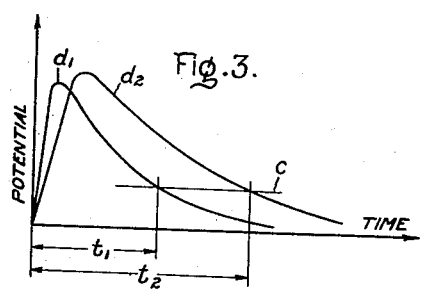
Inventor:
Hellmut Anschütz,
by Charles E. Mullar
His Attorney.

Patented Dec. 18, 1934

1,985,069

UNITED STATES PATENT OFFICE 1,985,069

ELECTRIC TIMING CIRCUIT

Hellmut Anschütz, Berlin-Schmargendorf, Germany, assignor to General Electric Company, a corporation of New York Application April 11, 1933, Serial No. 665,572
In Germany May 24, 1932

7 Claims. (Cl. 175—320)

My invention relates to electric timing circuits and more particularly to circuits including one or more electric valves for producing a current impulse of a predetermined duration.

There is often required in electric translating circuits current impulses of extremely short duration, for example, one-tenth or one one-hundredth of a second. The production of impulses of such short duration by means of mechanical relays or rotating contact apparatus involves considerable inaccuracy in spite of the most delicate adjustment of the moving parts.

It is an object of my invention to provide a new and improved electric timing circuit utilizing electric valves by means of which there may be produced current impulses of extremely short duration.

It is another object of my invention to provide a new and improved electric timing circuit including an electric valve by means of which there may be produced accurately timed current impulses of extremely short duration.

It is a further object of my invention to provide an improved electric timing circuit including an electric valve by means of which there may be produced an electric current impulse of which both the beginning and termination may be accurately timed.

It is a still further object of my invention to provide an improved electric timing circuit including an electric valve by means of which there may be produced current impulses of a duration variable within wide limits.

In accordance with one embodiment of my invention, a load device, which may be an indicating or a control circuit, is energized from a source of current through an electric valve, the grid of which is normally biased to maintain the valve nonconductive. The grid is also energized from an electromagnetic energy storage device, such, for example, as a transforming device or a grid transformer capable of storing an appreciable amount of energy in its magnetic field, and there is provided means for supplying a unidirectional current impulse to the primary winding of the grid transformer. This impulse produces a potential transient in the secondary winding which is effective to overcome the grid bias of the electric valve and to render it conductive for an interval of time dependent upon the time constants of the transformer. The interval during which the electric valve is conductive may be varied by varying the time constants of the transformer as by varying the reluctance or permeability of its magnetic path or the interval may be varied by energizing the anode circuit of the electric valve with an alternating current and timing the impulse of unidirectional current to the grid transformer with respect to the potential of the alternating current circuit supplying the electric valve and the load device.

For a better understanding of my invention, together with other and further objects thereof, reference may be had to the following description taken in connection with the accompanying drawing and its scope will be pointed out in the appended claims. In the accompanying drawing, Fig. 1 is a diagrammatic representation of one embodiment of my invention for producing current impulses of extremely short duration variable within wide limits, while Figs. 2 and 3 represent certain operating characteristics of the arrangement of Fig. 1 to aid in the understanding of the invention.

Referring now more particularly to Fig. 1 of the drawing, there is illustrated an arrangement for transmitting current impulses to a load device 10 from an alternating current supply circuit 11. This apparatus comprises a transformer 12 and a pair of electric valves 13 and 14 connected in a conventional manner to secure full wave rectification. Electric valves 13 and 14 are each provided with an anode, a cathode, and a control grid, and may be of any of the several types well known in the art, although I prefer to use valves of the vapor electric discharge type, so that the magnitude of the current impulse supplied to the load device 10 will be independent of the magnitude of the grid control potential. The grids of the electric valves 13 and 14 are connected to their common cathode circuit through a negative bias battery 15 which may be shunted by a resistor 15a, current limiting resistors 16, and a secondary winding 17 of a grid transformer 18. The grid transformer 18 is preferably provided with a variable time constant, as for example, by so constructing it that the reluctance or permeability of its magnetic path may be varied. The primary winding 19 of the grid transformer 18 is energized from a source of direct current, such as a battery 20 through a variable resistor 21, the contacts 22 of a switch mechanism 23, and an electric valve 24. Electric valve 24 is provided with an anode, a cathode, and a control grid, and is also preferably of the vapor electric discharge type. The grid of electric valve 24 is connected to its cathode through a current limiting resistor 25, a biasing resistor 26, a negative bias battery 27 and the secondary winding of a control transformer 28. The biasing resistor 26 is connected to be energized from a positive bias battery 30, which is effective to overcome the negative bias battery 27, through the contacts 29 of the switch mechanism 23. The switch mechanism 23 may be operated manually or in response to any control mechanism, and is preferably of the instantaneous closing, time delay opening type. The primary winding of the grid transformer 28 may be energized from the alternating current circuit 11 through any suitable phase shifting arrangement, such, for example, as an impedance phase shifting circuit comprising a transformer 31 and a reactor 32 and variable resistor 33 connected in a well known manner. The control transformer 28 is preferably self saturating so that the potential supplied by its secondary winding is of peaked wave form.

In explaining the operation of the above described apparatus, it will be assumed that initially the push button switch 23 is in its open position, as illustrated, and that the circuit 11 is energized. Under these conditions the negative bias supplied by the battery 27 is effective to maintain electric valve 24 nonconductive so that the primary winding 19 of the transformer 18 is maintained deenergized both by the electric valve 24 and the contacts 22 of the switch mechanism 23. At the same time the negative bias battery 15 is effective to maintain electric valves 13 and 14 nonconductive. If the pushbutton switch 23 be depressed, the potential of the battery 30 is effective to overcome the negative bias of the battery 27, but insufficient to render the electric valve 24 conductive. However, at a point in the cycle of the alternating potential of the circuit 11 dependent upon the setting of variable resistor 33, a positive impulse will be impressed upon the grid of the electric valve 24 through the grid transformer 28. As stated above, the transformer 28 is preferably self-saturating so that its output potential is of a peaked wave form, by means of which the point in the cycle of alternating potential at which electric valve 24 is rendered conductive may be accurately timed. As the electric valve 24 is rendered conductive by this positive impulse, the primary winding 19 of the transformer 18 is energized with a unidirectional current impulse from the battery 20 through the circuit including the variable resistor 21, the contacts 22 of the switch 23, and electric valve 24. As the unidirectional current builds up in the winding 19 a potential impulse will be induced in the secondary winding 17, the wave form of which is dependent upon the time constants of the transformer 18. This impulse is effective to overcome the negative bias of the battery 15 and to render the electric valves 13 and 14 conductive for an interval equal to that during which the magnitude of the positive potential impulse is greater than the negative bias of the battery 15.

This operation may be understood more readily by referring to Fig. 2 of the drawing. In this figure the curves $a$ represent the anode potentials of the electric valves 13 and 14; the curves $b$, the critical grid potential of the corresponding valves, and the line $c$, the negative bias supplied by the battery 15. In the same figure the curve $d$ corresponds to the potential impulse induced in the winding 17 by the building up of the unidirectional current in the winding 19. For example, under the conditions assumed above, the variable resistor 33 is adjusted so that a positive impulse is impressed upon the grid of the electric valve 24 at the instant $e$. One of the valves, for example, valve 13, will become conductive substantially simultaneously, since the potential represented by the curve $d$ rises almost vertically upon the electric valve 24 becoming conductive and intersects the critical grid potential curve $b$ as indicated in Fig. 2. Current will then be supplied to the load device through the electric valves 13 and 14 and so long as the resultant grid potential is greater than their critical grid potential. When the potential impulse is as represented by the curve $d$ of Fig. 2, it is seen that the current impulse supplied to the load device 10 comprises a portion of the first half cycle of alternating potential and the two full succeeding portions, after which the resultant grid potential has dropped below the critical grid potential of the valves 13 and 14. In other words, there has been supplied to the load device 10 a current impulse of duration $t$. The duration of the current impulse supplied to the load device 10 may be varied by varying the resistor 33 and thus shifting the phase of the initial positive impulse supplied to the grid of the electric valve 24 and shifting the point $e$ at which one of the electric valves 13 or 14 is initially rendered conductive.

The duration of the current impulse supplied to the load device 10 may also be varied within wide limits by varying the setting of resistor 21 or the time constants of the transformer 18, as, for example, by varying its air gap to vary its reluctance or by varying its saturation to vary its permeability, or by any other well known expedients. The result of the variation of the time constants of the transformer 18 is illustrated in Fig. 3 of the drawing in which the curves $d_1$ and $d_2$ represent current impulses supplied by the secondary winding 17 for different values of time constants of the transformer 18. Assuming the negative bias $c$ supplied by the battery 15, the corresponding duration of the current impulses supplied to the load device 10 will then be represented by the interval $t_1$ and $t_2$, respectively. It will also be apparent that the variations of the phase of the initial impulse supplied to the grid of the valve 24 by the variable resistor 33 and the variation of the time constants of the transformer 18 may be used together to secure a variation in the duration of the current impulse supplied to the load device 10 with a high degree of accuracy and within wide limits.

While I have disclosed a transforming device or electromagnetic energy storage device to be in the form of a transformer provided with means for selectively controlling the characteristics thereof, it is to be understood that any other device may be utilized which has the characteristics which will produce an operation such as is disclosed by the characteristic curves in Figs. 2 and 3. Obviously, of course, this may be, for example, an autotransformer, a choke inductor or some other transforming device which will transform the direct current impulse into a transient having a time duration sufficient to control the energization of the discharge devices 13 and 14 for the desired time interval.

While I have described what I at present consider the preferred embodiment of my invention, it will be obvious to those skilled in the art that various changes and modifications may be made without departing from my invention, and I, therefore, aim in the appended claims to cover all such changes and modifications as fall within the true spirit and scope of my invention.

What I claim as new and desire to secure by Letters Patent of the United States is:

1. An electric timing circuit comprising a source of current, a load device, an electric valve for controlling the transmission of energy from said source to said device, means for normally maintaining said valve nonconductive, a transforming device including a control winding for overcoming said means to render said valve conductive, means for selectively controlling the constants of said transforming device, and means for supplying a unidirectional current impulse to said transforming device to render said valve conductive for an interval dependent upon the constants of said transforming device.

2. An electric timing circuit comprising a source of current, a load device, means for controlling the transmission of energy from said source to said device including an electric valve provided with a control grid, an excitation circuit for said grid including a transforming device and means for biasing said grid to maintain said valve normally nonconductive, means for selectively controlling the characteristics of said transforming device to control the time constants thereof, and means for supplying a unidirectional current impulse to said grid transforming device to render said valve conductive for a predetermined interval.

3. An electric timing circuit comprising a source of current, a load device, means for controlling the transmission of energy from said source to said device including an electric valve provided with a control grid, an excitation circuit for said grid including a transformer and means for biasing said grid to maintain said valve normally nonconductive, means for supplying a unidirectional current impulse to said transformer to render said valve conductive for a predetermined interval, and means for varying the time constants of said transformer to vary said interval.

4. An electric timing circuit comprising a source of alternating current, a load device, means for controlling the transmission of energy from said source to said device including an electric valve provided with a control grid, an excitation circuit for said grid including means for biasing said grid to maintain said valve normally nonconductive and a grid transformer, an energizing circuit for said transformer including a source of direct current and an auxiliary vapor electric valve provided with a control grid, means for exciting the grid of said auxiliary valve with an alternating potential derived from said source, and means for varying the phase of said alternating potential to vary the interval during which said first mentioned valve is conductive.

5. An electric timing circuit comprising a source of alternating current, a load device, means for controlling the transmission of energy from said source to said device including an electric valve provided with a control grid, an excitation circuit for said grid including means for biasing said grid to maintain said valve normally nonconductive and a grid transformer, an energizing circuit for said transformer including a source of direct current and an auxiliary vapor electric valve provided with a control grid, means for exciting the grid of said auxiliary valve with an alternating potential derived from said source, an means for varying the time constants of said means for varying to provide one variation in the interval during which said first mentioned valve is conductive, and means for varying the phase of said alternating potential to provide a second variation in said interval.

6. An electric timing circuit comprising a source of alternating current, a load device, means for controlling the transmission of energy from said source to said device including an electric valve provided with a control grid, an excitation circuit for said grid including means for biasing said grid to maintain said valve normally nonconductive and a grid transformer, an energizing circuit for said transformer including a source of direct current and an auxiliary vapor electric valve provided with a control grid, an excitation circuit for the grid of said auxiliary valve including a source of bias potential to render said auxiliary valve normally nonconductive and means for deriving from said alternating current source an alternating potential of an amplitude insufficient to render said auxiliary valve conductive against said bias, means for overcoming said bias potential to render said auxiliary valve conductive, and means for varying the phase of said alternating potential to vary the interval during which said first mentioned valve is conductive.

7. An electric timing circuit comprising a source of alternating current, a load device, means for controlling the transmission of energy from said source to said device including an electric valve provided with a control grid, an excitation circuit for said grid including means for biasing said grid to maintain said valve normally nonconductive and a grid transformer, an energizing circuit for said transformer including a source of direct current and an auxiliary vapor electric valve provided with a control grid, an excitation circuit for the grid of said auxiliary valve including a source of bias potential to render said auxiliary valve normally nonconductive and means for deriving from said alternating current source an alternating potential of an amplitude insufficient to render said auxiliary valve conductive against said bias, a source of unidirectional potential for overcoming said bias potential, and time delay opening switching means provided with contacts in the anode-cathode circuit of said auxiliary valve and contacts effective to connect the source of unidirectional potential in the grid circuit of said auxiliary valve, and means for varying the phase of said alternating potential to vary the interval during which said first mentioned valve is conductive.

HELLMUT ANSCHÜTZ.